US012634311B2

(12) United States Patent
Saeed et al.

(10) Patent No.: US 12,634,311 B2
(45) Date of Patent: May 19, 2026

(54) NETWORK ANOMALY DETECTION

(71) Applicant: BRITISH TELECOMMUNICATIONS PUBLIC LIMITED COMPANY, London (GB)

(72) Inventors: Ahmed Saeed, London (GB); Giulio Giaconi, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 492 days.

(21) Appl. No.: 17/915,458

(22) PCT Filed: Mar. 12, 2021

(86) PCT No.: PCT/EP2021/056337
§ 371 (c)(1),
(2) Date: Sep. 28, 2022

(87) PCT Pub. No.: WO2021/197806
PCT Pub. Date: Oct. 7, 2021

(65) Prior Publication Data
US 2023/0125203 A1     Apr. 27, 2023

(30) Foreign Application Priority Data

Mar. 31, 2020    (EP) ..................................... 20167332

(51) Int. Cl.
*H04L 9/40*        (2022.01)
*H04L 41/16*       (2022.01)

(52) U.S. Cl.
CPC .......... *H04L 63/1425* (2013.01); *H04L 41/16* (2013.01); *H04L 63/1441* (2013.01)

(58) Field of Classification Search
CPC ........................ H04L 63/1425; H04L 63/1441
See application file for complete search history.

(56) References Cited

U.S. PATENT DOCUMENTS 7,424,619 B1 *   9/2008   Fan ..................... H04L 63/1425
                                                   713/188
10,200,382 B2 *  2/2019   Medvedovsky .... H04L 63/1425
                          (Continued)

FOREIGN PATENT DOCUMENTS

CN        107205244        9/2017
CN        108040074        5/2018
                  (Continued)

OTHER PUBLICATIONS

M. F. Lima, B. B. Zarpelão, L. D. H. Sampaio, J. J. P. C. Rodrigues, T. Abrão and M. L. Proença, "Anomaly detection using baseline and K-means clustering," SoftCOM 2010, 18th International Conference on Software, Telecommunications and Computer Networks , Split, Croatia, 2010, pp. 305-309. (Year: 2010).*
                  (Continued)

*Primary Examiner* — Patrice L Winder
(74) *Attorney, Agent, or Firm* — Nixon & Vanderhye P.C.

(57)            ABSTRACT

A computer implemented method for detecting anomalies in a computer network is provided together with a network monitoring system and computer programs for carrying out the method. The method obtains a model representing normal characteristics of network traffic associated with a set of devices within the computer network. The method analyses network traffic using the model to identify anomalous network traffic associated with the set of devices. The method clusters the anomalous network traffic into clusters of network traffic that share similar characteristics. The method provides an indication that either (i) the network traffic associated with a cluster relates to a new type of anomaly involving the set of devices or (ii) that no new types of anomaly are present.

19 Claims, 4 Drawing Sheets

(56)                References Cited

U.S. PATENT DOCUMENTS

| | | | |
|---|---|---|---|
| 2006/0212942 A1 | 9/2006 | Barford et al. | |
| 2007/0289013 A1 | 12/2007 | Lim | |
| 2012/0284793 A1* | 11/2012 | Steinbrecher | H04L 63/1425 709/224 |
| 2016/0028750 A1* | 1/2016 | Di Pietro | H04L 63/1425 726/23 |
| 2016/0226894 A1 | 8/2016 | Lee et al. | |
| 2016/0342903 A1* | 11/2016 | Shumpert | G06F 11/008 |
| 2017/0124478 A1 | 5/2017 | Baradaran et al. | |
| 2017/0171234 A1* | 6/2017 | Christian | H04L 63/1425 |
| 2018/0129579 A1 | 5/2018 | Debnath et al. | |
| 2018/0198812 A1* | 7/2018 | Christodorescu | H04L 63/1425 |
| 2019/0081969 A1 | 3/2019 | Phadke et al. | |
| 2019/0260786 A1 | 8/2019 | Dunn | |
| 2019/0294524 A1* | 9/2019 | Gupta | G06F 11/364 |
| 2020/0067935 A1* | 2/2020 | Carnes, III | H04L 63/101 |
| 2020/0358792 A1* | 11/2020 | Bazalgette | H04L 63/1416 |
| 2020/0380531 A1* | 12/2020 | Vaidya | G06N 20/00 |
| 2021/0049270 A1* | 2/2021 | Urmanov | G06F 21/561 |

FOREIGN PATENT DOCUMENTS

| | | | |
|---|---|---|---|
| KR | 10-2016-0119678 | | 10/2016 |
| MY | 179481 A | * | 11/2020 |
| WO | 2018/224669 | | 12/2018 |

OTHER PUBLICATIONS

D. Liu, C.-H. Lung, N. Seddigh and B. Nandy, "Network Traffic Anomaly Detection Using Adaptive Density-Based Fuzzy Clustering," 2014 IEEE 13th International Conference on Trust, Security and Privacy in Computing and Communications, Beijing, China, 2014, pp. 823-830, doi: 10.1109/TrustCom.2014.109. (Year: 2014).*
International Preliminary Report on Patentability dated Oct. 13, 2022 issued for International Application No. PCT/2021/056337 (8 pages).
Mohiuddin Ahmed, et al., "A survey of network anomaly detection techniques", Journal of Network and Computer Applications, vol. 60, 2016, pp. 19-31 (13 pages).
"Benchmarking Performance and Scaling of Python Clustering Algorithms", The Wayback Machine, hdbscan, accessed Feb. 25, 2019, 13 pages, https://hdbscan.readthedocs.io/en/latest/performance_and_scalability.html#comparison-of-fast-implementations.
Elhadj Benkhelifa, et al., "A Critical Review of Practices and Challenges in Intrusion Detection Systems for IoT: Toward Universal and Resilient Systems", IEEE Communications Surveys & Tutorials, vol. 20, No. 4, Fourth Quarter 2018, pp. 3496-3509 (14 pages).
Pedro Casas Hernandez, et al., "Unsupervised Network Intrusion Detection Systems: Detecting the Unknown without Knowledge", Computer Communications, Elsevier, vol. 35, No. 7, 2012, pp. 772-783 (13 pages).
A.M. Chandrasekhar, et al.: "Intrusion Detection Technique by using K-means, Fuzzy Neural Network and SVM classifiers", 2013 International Conference on Computer Communication and Informatics (ICCCI-2013), Jan. 4-6 2013, 7 pages.
Antonio Gonzalez Pastana Lobato, et al., "An Adaptive Real-Time Architecture for Zero-Day Threat Detection", 2018 IEEE International Conference on Communications (ICC 2018), 6 pages.
Leland McInnes, et al., "hdbscan: Hierarchical density based clustering", The Journal of Open Source Software, vol. 2, No. 11. 2017, 2 pages.
Gerhard Munz, et al., "Traffic Anomali Detection Using K-Means Clustering", 2007, 8 pages.
Antonia Nisioti, et al., "From Intrusion Detection to Attacker Attribution: A Comprehensive Survey of Unsupervised Methods", IEEE Communications Surveys & Tutorials, Jul. 2018, 24 pages.
Fei Yuan, et al., "Data Density Correlation Degree Clustering Method for Data Aggregation in WSN", IEEE Sensors Journal, vol. 14, No. 4, Apr. 2014, pp. 1089-1098 (10 pages).
Bruno Bogaz Zarpelão, et al., "A survey of intrusion detection in Internet of Things", Journal of Network and Computer Applications, accepted Feb. 19, 2017, 13 pages.
Combined search and Examination Report for GB Application No. 2004740.3 dated Dec. 15, 2020, 9 pages.
Extended European Search Report for GB Application No. 20167332.4 dated Jul. 17, 2020, 8 pages.
Notification of Grant for Patent Serial No. GB2593735 dated Jul. 5, 2022, 2 pages.
International Search Report and Written Opinion of the ISA for PCT/EP2021/056337 dated Mar. 31, 2021, 14 pages.
Communication pursuant to Article 94(3) EPC dated Mar. 28, 2025, issued for European Application No. 21 710 385.2-1218 (7 pages).

* cited by examiner

NETWORK ANOMALY DETECTION

CROSS-REFERENCE TO RELATED APPLICATIONS

This application is the U.S. national phase of International Application No. PCT/EP2021/056337 filed Mar. 12, 2021 which designated the U.S. and claims priority to EP patent application Ser. No. 20/167,332.4 filed Mar. 31, 2020, the entire contents of each of which are hereby incorporated by reference.

FIELD OF THE INVENTION

The present invention relates to a method for detecting anomalies in a computer network. In particular, the present invention identifies new types of anomaly occurring in a computer network.

BACKGROUND TO THE INVENTION

Modern computer networks are typically growing in both size and complexity. Furthermore, the range of different types of computing devices that can be found in a typical computer network is also increasing. Faced with such complexity, detecting undesirable activity occurring with a computer network, such as an attack or malfunction, is increasingly difficult. In particular, it is likely to be impractical for a human to manually analyse all activity occurring in a network to try to identify undesirable activity. Furthermore, to do so would lead to a long delay in detecting undesirable activity.

An intrusion detection system (IDS) is a device or software application that may typically be used to monitor a network (or devices within the network) in order to detect attacks (or abnormal behaviour) on the network (or devices in it) and alert an administrator of the network accordingly. Some intrusion detection systems work by analysing traffic that is being transmitted over the network in order to identify network traffic that is associated with an attack. Broadly speaking, such intrusion detection systems may be split into two different types, signature-based intrusion detection and anomaly-based intrusion detection.

Signature-based intrusion detection systems look for specific patterns in the network traffic that are associated with a known attack. However, one drawback to signature-based intrusion detection system is that they cannot detect new attacks for which no pattern is yet known. As the rate at which new types of attacks (e.g. new types of malware) increases, the likelihood of an attack failing to be detected by a signature-based intrusion detection system (because it is not yet known) may increase.

Anomaly-based intrusion detection systems address some of the drawbacks with signature-based intrusion detection systems. In particular, anomaly-based intrusion detection systems can detect previously unknown attacks. In general, anomaly-based intrusion detection systems work by comparing a device's behaviour to the "normal" behaviour that is expected for the device. Any deviations from the device's "normal" behaviour are then considered to be anomalies that could indicate an attack involving that device. That is to say, anomaly-based intrusion detection systems work on the premise that attacks (or indeed other kinds of undesirable behaviour such as device malfunction) are considered likely to result in the device's behaviour changing in a way that is detectable. Therefore, by detecting deviations from a device's normal behaviour (i.e. anomalies), potential attacks (or other undesirable behaviour) can be identified, even when they are a new type of attack (or other undesirable behaviour) that has not previously been seen. In order to detect anomalies, anomaly detection techniques typically employ machine learning techniques to learn a model of a device's normal behaviour as exhibited during a training period and then use the model to detect deviations from the learnt behaviour during a subsequent period of time (also referred to as a testing period). A variety of techniques have been employed for learning such a model, ranging from classification techniques, such as support vector machines, Bayesian networks or neural networks, to statistical, clustering and information-theoretic techniques. Network-based anomaly-based intrusion detection systems rely on the network traffic associated with a device (i.e. it's communication with other devices on a network) to both build a model of a device's normal behaviour (i.e. the normal patterns of network traffic associated with the device) and any anomalies (i.e. unusual patterns of network traffic associated with the device). Typically, when an anomaly is detected an alert will be generated to enable the anomaly to be analysed and any appropriate intervention to be performed.

SUMMARY OF THE INVENTION

According to a first aspect of the invention, there is provided a computer implemented method for detecting anomalies in a computer network, the method comprising: obtaining a model representing normal characteristics of network traffic associated with a set of devices within the computer network; analysing network traffic using the model to identify anomalous network traffic associated with the set of devices; clustering the anomalous network traffic into clusters of network traffic that share similar characteristics; and providing an indication that either (i) the network traffic associated with a cluster relates to a new type of anomaly involving the set of devices or (ii) that no new types of anomaly are present.

The method may further comprise updating the model in response to receiving an indication that the network traffic associated with the cluster relates to a new type of normal behaviour for the set of devices such that the updated model represents the characteristics of the network traffic associated with the cluster as being normal characteristics for the set of devices.

The method may further comprise: obtaining a second model representing the characteristics of network traffic associated with known types of anomalies involving the set of devices. The analysis of the network traffic using the model to identify anomalous network traffic associated with the set of devices may further comprise using the second model to identify anomalous network traffic that is not associated with a known type of anomaly involving the set of devices.

The method may further comprise updating the second model in response to receiving an indication confirming that the network traffic associated with the cluster is anomalous such that the updated second model represents the characteristics of the network traffic associated with the cluster as being associated with a known type of anomaly involving the set of devices.

The method may further comprise identifying anomalous network traffic that is not associated with a cluster as being benign.

The characteristics of the network traffic may be aggregate characteristics aggregated from the network traffic collectively associated with the set of devices during a time interval of predetermined duration. The aggregate characteristics may comprise one or more, or all, of: a number of packets sent; a number of packets received; an average sent packet size; an average received packet size; a variation in sent packet size; a variation in received packet size; a total amount of data sent; a total amount of data received; a number of distinct destination IP addresses to which packets are sent; a number of distinct source IP addresses from which packets are received; a number of distinct destination ports to which packets are sent; and a number of distinct source ports from which packets are received.

The devices in the set of devices may all be the same type of device. The devices in the set of devices are all IoT devices and are preferably all associated with the same IoT system. The set of devices may consist of a single device in the computing network. The set of devices may comprise a plurality of devices, such that the model represents the normal characteristics of network traffic associated with the plurality of devices as a whole. The set of devices may comprise all devices in the computer network, such that the model represents the normal characteristics of network traffic associated with the network as a whole.

According to a second aspect of the invention, there is provided a network monitoring system comprising a processor and a memory storing computer program code for performing a method according to the first aspect. The program code may comprise: one or more program code modules that are each configured for monitoring a respective device; one or more program code modules that are each configured for monitoring a respective group of devices; and a program code module that is configured for monitoring the network as a whole.

According to a third aspect of the invention, there is provided a computer program which, when executed by one or more processors, is arranged to carry out a method according to the first aspect.

BRIEF DESCRIPTION OF THE FIGURES

In order that the present invention may be better understood, embodiments thereof will now be described, by way of example only, with reference to the accompanying drawings, in which.

DETAILED DESCRIPTION OF EMBODIMENTS

Figure 1:
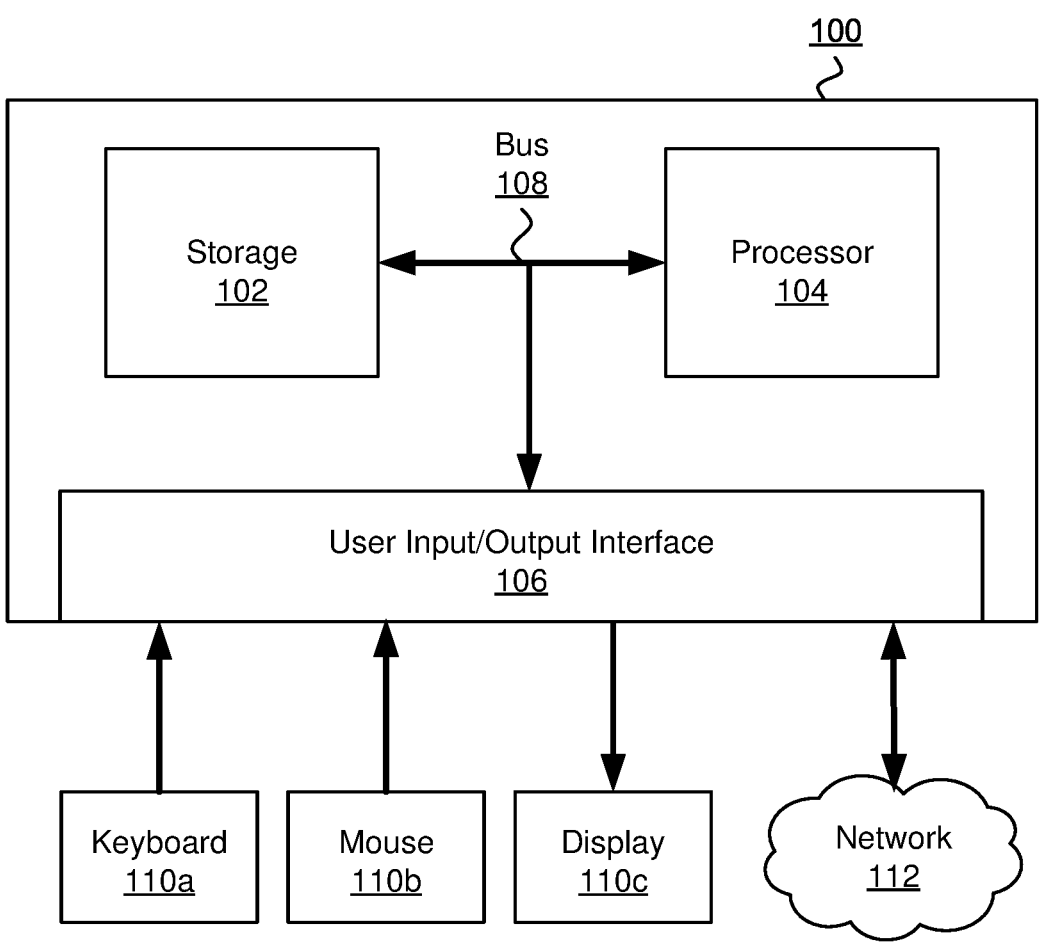
FIG. 1 is a block diagram of a computer system suitable for the operation of embodiments of the present invention.

FIG. 1 is a block diagram of a computer system 100 suitable for the operation of embodiments of the present invention. The system 100 comprises: a storage 102, a processor 104 and an input/output (I/O) interface 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage devices in the hierarchy providing differing capacities and response time, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs which, when executed by the processor 104, cause the processor 104 to carry out a method according to an embodiment of the invention, as discussed below (and accordingly configure the system 100 to be a system 100 according to an embodiment of the invention).

The input/output (I/O) interface 106 provides interfaces to devices 110 for the input or output of data, or for both the input and output of data. The devices 110 may include user input interfaces, such as a keyboard 110a or mouse 110b as well as user output interfaces, such as a display 110c. Other devices, such a touch screen monitor (not shown) may provide means for both inputting and outputting data. The input/output (I/O) interface 106 may additionally or alternatively enable the computer system 100 to communicate with other computer systems via one or more networks 112. It will be appreciated that there are many different types of I/O interface that may be used with computer system 100 and that, in some cases, computer system 100, may include more than one I/O interface. Furthermore, there are many different types of device 100 that may be used with computer system 100. The devices 110 that interface with the computer system 100 may vary considerably depending on the nature of the computer system 100 and may include devices not explicitly mentioned above, as would be apparent to the skilled person. For example, in some cases, computer system 100 may be a server without any connected user input/output devices. Such a server may receive data via a network 112, carry out processing according to the received data and provide the results of the processing via a network 112.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of: a personal computer; a laptop; a tablet; a mobile telephone (or smartphone); a television set (or set top box); a games console; an augmented/virtual reality headset; a server; or indeed any other computing device with sufficient computing resources to carry out a method according to this invention.

Figure 2:
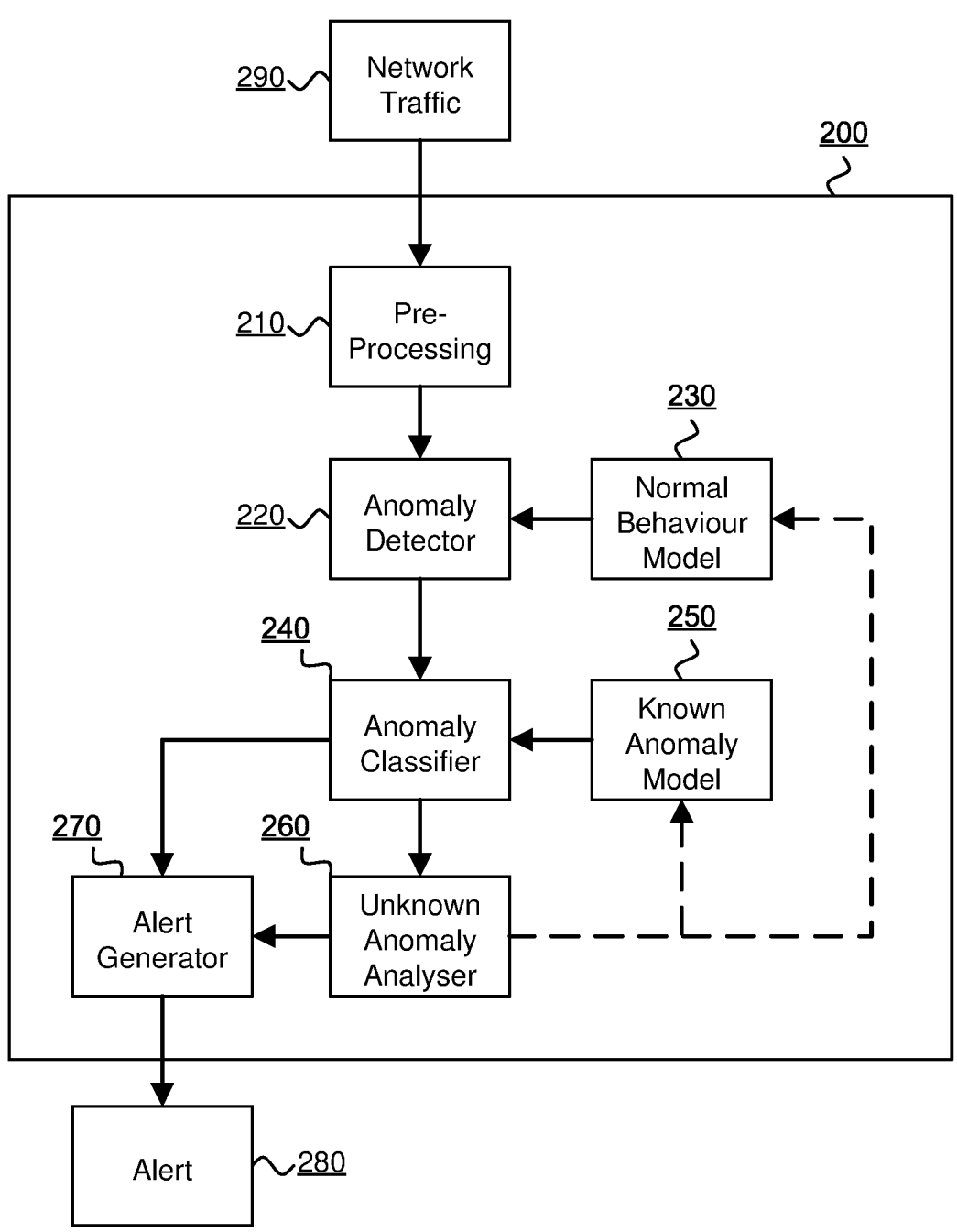
FIG. 2 is a block diagram of an anomaly detection system according to the invention.

FIG. 2 is a block diagram of an anomaly detection system 200 according to the invention. The anomaly detection system 200 may be implemented on any suitable computer system 100, such as those discussed above. The anomaly detection system 200 comprises a network traffic pre-processing module 210, an anomaly detector 220, a normal behaviour model 230, an anomaly classifier 240, a known anomaly model 250, an unknown anomaly analyser 260 and an alert generator 270.

The anomaly detection system 200 is operable to monitor a set (or group) of computer devices (or computing devices) within a network. The anomaly detection system monitors the set of computer devices to detect new types of previously unknown anomalies involving those computer devices.

When a new type of anomaly is detected, an alert 280 is provided. This alert 280 may be provided to a human operator to enable a manual investigation of the new type of anomaly. Additionally, or alternatively, the alert 280 can be provided to a computer system 100 to enable an automated response to the new type of anomaly.

The anomaly detection system 200 may be configured to monitor an individual computing device within the network. That is to say, the set of computer devices being monitored by the system 200 may comprise a single computer device. In such cases, the anomaly detection system 200 detects deviations from the normal behaviour of that device.

In other situations, the anomaly detection system 200 may be configured to monitor a group of computing devices. That is to say, the set of computer devices being monitored by the system 200 may comprise a plurality of computer devices. In such cases, the anomaly detection system 200 detects deviations from the normal behaviour of the group of computer devices collectively (that is to say the behaviour of the group of computer devices as a whole). As will be discussed in more detail later on, by monitoring the collective behaviour of a group of devices as a whole, rather than simply monitoring each device individually, different types of anomalies can be picked up that would not be detected by simply monitoring each device in the group individually.

In order to monitor the set of computer devices, the anomaly detection system 200 analyses network traffic data 290 relating to those computer devices. The anomaly detection system 200 receives network traffic data 290 relating to the set of computer devices. The network traffic data 290 comprises information relating to the communications (i.e. data packets or flows) that were received or sent by each of the computer systems being monitored during a particular time period. The network traffic data 290 may be provided to the anomaly detection system 200 or may be retrieved by the anomaly detection system 200. For example, the anomaly detection system 200 may retrieve the network traffic data 290 from various routers, switches or access points within the network.

The pre-processing module 210 processes the received network traffic data 290 ready for use by the other components of the system 200. In particular, the pre-processing module 210 may perform operations such as device filtering and/or data aggregation on the received traffic data 290.

The device filtering operations filter the network traffic data 290 such that it only contains information relating to communications involving the specific set of computer devices 100 that are being monitored by the system 200. That is to say, the device filtering operations remove any traffic data relating to communications made by any other computer systems 100 that are not being monitored by the system 200. For example, the device may look for any communications flows where a source or destination network address, such as an IP address, corresponds to the network address of one of the computer systems 100 being monitored and may discard any flows where neither the source nor the destination network address matches that of one of the monitored computer systems 100.

The data aggregation operations aggregate the network traffic data 290 to extract meaningful features of the network traffic data. Specifically, the data aggregation operations group the network traffic data 290 into a plurality of equally spaced time intervals (or aggregation windows) of pre-determined duration. The main aim of converting the network traffic into time-series data points (each of the data points resulting from the aggregation of the network traffic in a time interval) through this aggregation is to align them with respect to time which helps improve the accuracy of the characterisation of the network traffic data. The data aggregation operations then process the grouped network traffic data for each time interval to determine the features (or properties) of all the network traffic data for the set of computer devices that occurred during that time interval. For example, the features that may be determined for the network traffic data 290 in each time interval may include one or more, or all, of: a number of packets sent by the set of computer devices during that time interval; a number of packets received by the set of computer devices during that time interval; an average sent packet size sent by the set of computer devices packet size during that time interval; an average packet size received by the set of computer devices during that time interval; a variation (e.g. the standard deviation) in the size of packets received during that time interval; a variation (e.g. the standard deviation) in the size of packets sent during that time interval; a total amount of data sent by the set of computer devices during that time period; a total amount of data received by the set of computer devices during that time period; a number of distinct destination IP addresses to which packets are sent by the set of computer devices during that time period; a number of distinct source IP addresses from which packets are received by the set of computer devices during that time period; a number of distinct destination ports to which packets are sent by the set of computer devices during that time period; and a number of distinct source ports from which packets are received by the set of computer devices during that time period. Of course any other suitable features may also be determined and used by the system. The features that are extracted represent the characteristics of the network traffic during each time period.

As a result of such aggregation operations, the features that are extracted when considering a plurality of computing devices as a whole can yield different information from the information that would be available by considering each device individually. For example, a group of homogeneous computer devices, such as a particular type of IoT device, may carry out a particular operation, such as periodically sending reports to a server, on a routine or regular basis. A possible attack might involve subverting the devices and synchronising them such that they all perform that operation simultaneously (whereas ordinarily the performance of the operation may not be synchronised) in an effort to overwhelm the server. Such an attack might not be detectable by monitoring each of the devices individually, since each device is not sending any more data, or increasing the frequency with which it is sending data. However, by monitoring the aggregated features of the group of computer devices as a whole, such attacks may be detectable. In particular, in this example, the total amount of data sent by the set of computer devices during the time period to which they have been synchronised to perform the operation is likely to exceed the boundaries of the normal behaviour for the set of computer devices as a whole (since ordinarily only a subset of the computer devices would perform the operation in any given time period).

In some cases, the network traffic data 290 that is received by the system 200 may already have been pre-processed such that the features of the traffic data for a particular set of computer devices to be monitored is provided to the system. In such cases, the system 200 need not carry out any pre-processing itself and the pre-processing module 210 can be omitted.

The operation of the various components of the anomaly detection system will now be discussed further in combination with FIG. 3.

Figure 3:
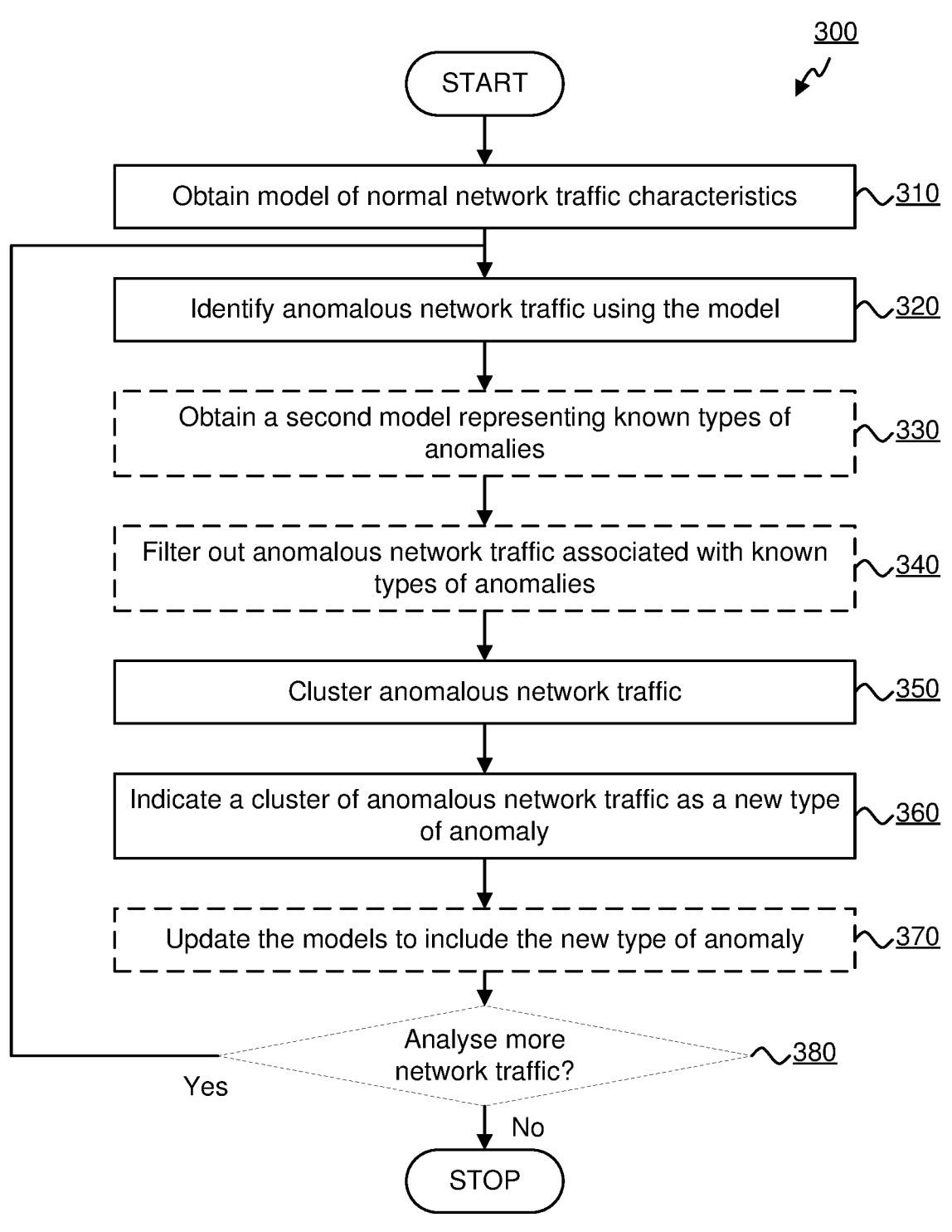
FIG. 3 is a flowchart illustrating a method for detecting anomalies in a computer network.

FIG. 3 is a flowchart illustrating a method 300 for detecting anomalies in a computer network, such as may be performed by the anomaly detection system 200. The method 300 starts at an operation 310.

At operation 310, the method 300 obtains the normal behaviour model 230. The normal behaviour model is a model representing the normal characteristics of network traffic associated with the set of computer devices to be monitored. Where a normal behaviour model 230 has already been learned for the set of computer devices, this may simply be provided or retrieved (such as from the storage 102 of a computer system 100 performing the method 300). Alternatively, the method 300 may learn the normal behaviour model 230.

To learn the normal behaviour model 230, the system 200 may be placed in a learning mode and provided with training data comprising network traffic data taken from a period of normal operation (i.e. in the absence of any anomalies, or at least comprising as few anomalies as possible). The system 200 may then determine how the traffic data should be aggregated (e.g. by pre-processing module 210) and which features should be extracted and may then train a machine learning model on those features using any suitable machine learning technique.

To determine how the traffic data should be aggregated, the system 200 may determine what size of aggregation window (i.e. the size of the time interval used by the pre-processing module 210) should be used. One way to determine the aggregation window size (i.e. the duration of the time interval), is to determine the distribution of the traffic data (such as by plotting a histogram using time duration of each flow as an input variable, so that the flows are collected in different bins where each bin maps to a non-overlapping time interval). Ideally, the duration of the aggregation window is selected such that a high percentage of the flows (e.g. more than 90%) should be covered by the window size. Based on the determined aggregation window size, the network traffic data is converted into time-series format and corresponding features are aggregated accordingly.

Having determined a window size and aggregated the network traffic data accordingly to generate a time-series for the different features within each time period, the system 200 may analyse the features to select those that best represent the normal characteristics of the network traffic for the set of devices (based on the training data). Various statistical and information-theoretical techniques may be used to select the features to be used by the model, as will be familiar to the skilled person. For example, the system 200 may consider the mutual information, information gain, correlation coefficients, and information entropy between the various features to identify those features that have low correlation (linear relationships) and higher entropy (uncertainty or segregation between the features). By selecting the most useful features, the computations and storage requirements can be reduced, as can the time required to learn the model and subsequently use the model to detect anomalies. It will be appreciated that during normal operation (i.e. when not in the learning mode), the pre-processing module 210 only needs to extract those features which are actually used by the normal behaviour model 230.

Finally, having selected the features that are most useful for building the model 230, the system 200 can use any suitable machine-learning technique to train the model 230 from the time-series of those features that were extracted from the training data. One suitable technique for learning the normal behaviour model 230 is the hierarchical density-based spatial clustering of applications with noise (HDB-SCAN) technique. HDBSCAN is an unsupervised density based algorithm capable of recognising clusters of an arbitrary shape along with the noise points. This algorithm can handle varying density clusters and is relatively fast when compared to its predecessor, the density-based spatial clustering of applications with noise (DBSCAN).

In any case, having obtained a normal behaviour model 230 for the set of computer devices to be monitored, the method 300 proceeds to an operation 320.

At operation 320, the method 300 uses the normal behaviour model 230 to identify anomalous network traffic associated with the set of devices. In particular, the anomaly detector 220 inputs the time series for the features of the network traffic data 290 that is to be analysed (such as may be provided by the pre-processing module 210 after processing network traffic data that has been captured during a recent period of time) into the normal behaviour model 230. The anomaly detector 220 then uses the output from the normal behaviour model 230 to determine whether the network traffic occurring during each aggregation window is normal. That is to say whether the features of the network traffic in an aggregation window of the time series substantially corresponds to the normal characteristics of the network traffic for the monitored set of computer devices or is anomalous.

For example, where the normal behaviour model is learnt using the HDBSCAN technique, the model will assign labels to each data point (i.e. combination of extracted features during a time window) of the time series indicating a cluster to which the data point may belong together with an indication of a probability (or strength) that the data point belongs to that cluster. Alternatively, the model will indicate that the data point cannot be assigned to any of the learnt clusters and is therefore an outlier. Any points which are identified as being outliers or which are not assigned any label with a sufficiently high probability (e.g. a probability which exceeds a predetermined threshold) may be considered to be anomalous data points.

When some anomalous network traffic data is identified at operation 320, the method 300 may proceed to an optional operation 330.

At optional operation 330, the method 300 obtains the known anomaly model 250. This is a different model from the normal behaviour model 230. In particular, the known anomaly model represents the characteristics of network traffic which are associated with known types of anomalies involving the set of devices. For example, various attacks or modes of failure may already be known for the set of devices and sample network traffic from such attacks or modes of failure can be used to train a machine learning model to classify network traffic having the same or similar characteristics. The method 300 then proceeds to operation 340.

At optional operation 340, the method 300 filters the anomalous network traffic that is provided by the anomaly detector 220. Specifically, the anomaly classifier 240 makes use of the known anomaly model 250 to classify the anomalous network traffic and filters out any network traffic that is classified as being a known type of anomaly, whilst keeping any network traffic that is classified as being an unknown type of anomaly. As will be appreciated, where a known type of anomaly is detected an alert may be raised indicating the classification of the known type of anomaly or a predetermined action may be taken to mitigate the effects of the known type of anomaly, or both.

In some cases, the system may simply treat all anomalies as unknown, in which case, it need not necessarily include the anomaly classifier 240 and the known anomaly model 250. Equally, as will be discussed in more detail, where a device (or group of devices) is new, no known anomalies may yet be known, in which case, these operations 330 and 340 may be bypassed until the system has learnt new types of anomaly for the device upon which the known anomaly model 250 can be built.

In any case, the method 300 then proceeds to an operation 350.

At operation 350, the method 300 clusters the unknown anomalous network traffic into clusters of network traffic that share similar characteristics. This is performed by the unknown anomaly analyser 260, which makes use of clustering techniques to generate labels for the unclassified data points. These clustering techniques perform unsupervised machine learning and label anomalous data points in the network traffic that exhibit similar patterns without requiring any input from a user. A unique label is assigned to each cluster that is identified.

At operation 360, the method 300 indicates that either (i) one or more clusters have been identified as being a new type of anomaly or (ii) that no new types of anomaly are present (e.g. if no anomalous network traffic is present). New types of anomaly, such as a new type of attack or failure mode, are expected to result in characteristics that are different from the normal operation of the device, but which also have their own characteristics. The method 300 may wait until the number of observations of a particular pattern of features that characterises a cluster exceeds a pre-determined number. The unknown anomaly analyser 260 may then cause the alert generator 270 to generate an alert 280 to indicate that a new type of anomaly has been identified. An alert 280 may also be provided to explicitly indicate that no new types of anomaly are present. Alternatively, the indication that no new types of anomaly were detected may be provided implicitly through the absence of an alert 280.

Random fluctuations in a device's behaviour, which are probably not associated with an underlying anomaly, such as an attack or failure, are unlikely to share characteristics and so may be identified as not belonging to any particular cluster. Accordingly, any anomalous network traffic which is not associated with a cluster by the clustering technique may be identified as being benign, since it is unlikely that they are indicative of an underlying anomaly.

Therefore, through the use cluster analysis on the unknown anomalous network traffic, new types of anomaly can be identified in an automated manner, whilst benign anomalous network traffic can be filtered out. Furthermore, the alerts 280 that may be generated may be more useful since they are more likely to correspond to a genuine anomaly. The network traffic associated with a cluster that corresponds to the new type of anomaly may also be made available, which can help to simplify the task of analysing the anomalies. Furthermore, by generating alerts relating to new types of anomaly in this way, rather than just whenever an anomaly is detected (i.e. the output from anomaly detector 220), the total number of alerts requiring consideration may be reduced allowing resources to be focused on anomalous traffic data that is most likely to be problematic.

At optional operation 370, the method 300 may update the models 230 and/or 250 to include the new type of anomaly that has been detected. In particular, the system 200 may receive an indication as to the nature of the new type of anomaly (e.g. that it relates to a new type of attack or fault, or that it is actually normal behaviour for the set of devices). This indication may be received, for example, from an analyst (either automated or human) following an investigation of an alert 280 generated by the system 200.

For example, the system 200 may receive an indication that the network traffic associated with the cluster relates to a new type of normal behaviour for the set of devices. This can happen, for example, when an IoT device receives a firmware update which changes the way it normally behaves. Accordingly, the normal behaviour model 230 may be updated so that in future it will indicate network traffic having the characteristics associated with the new type of normal behaviour as being normal and not anomalous. This can be achieved, for example, by adding the network traffic associated with the new type of normal behaviour (i.e. that associated with the cluster) to a set of training data for the normal behaviour model 230 and retraining the model 230.

Similarly, as another example, the system may receive an indication that the network traffic is indeed anomalous, such as that it relates to a new type of attack or fault. Accordingly, the known anomaly model 250 may be updated so that in future it will indicate network traffic having the characteristics associated with the new type of behaviour as being associated with a known type of anomaly and not an unknown type of anomaly. This can be achieved, for example, by adding the network traffic associated with the new type of anomaly (i.e. that associated with the cluster) to a set of training data for the known anomaly model 250 and retraining the model 250.

It will be appreciated that any suitable machine learning techniques may be used to learn or re-learn the models 230 and/or 250. Having updated either or both of the models 230 and/or 250, the method 300 proceeds to an operation 380.

At optional operation 380, the method 300 determines whether it should analyse further network traffic for the network covering a different period of time. For example, the method 300 may be run iteratively, with live network traffic data being captured for a period of time and then analysed on a repeated basis. If there is further network traffic data to be analysed, the method 300 reiterates to operation 320. Otherwise the method 300 ends.

Figure 4:
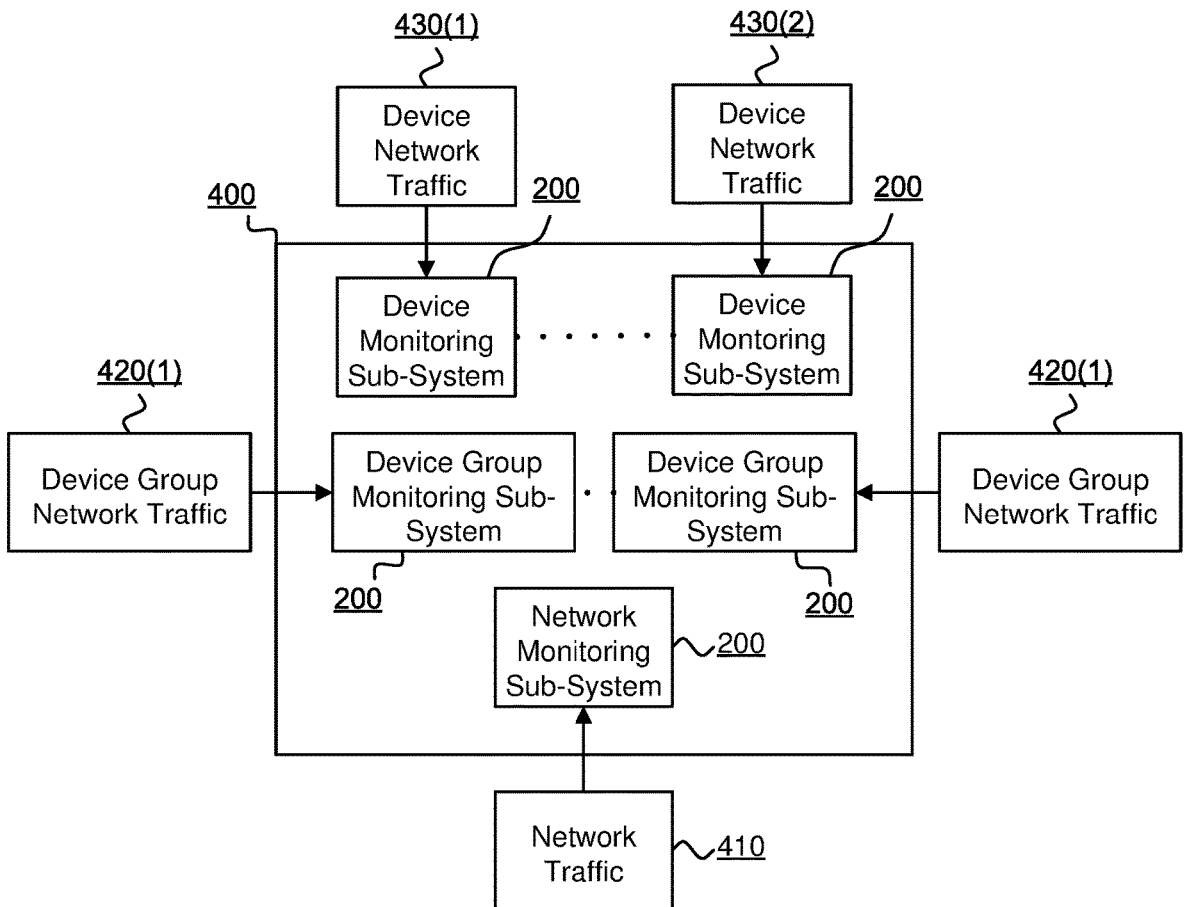
FIG. 4 is a block diagram of a multi-layer detection system according to some embodiments of the invention.

FIG. 4 is a block diagram of a multi-layer anomaly detection system 400 according to some embodiments of the invention. The multi-layer anomaly detection system 400 comprises a plurality of anomaly detection systems 200 of the kind discussed above in conjunction with FIGS. 2 and 3, each anomaly detection system forming a subsystem (or module) of the multi-layer anomaly detection system 400. As discussed above, each anomaly detection system may be configured to monitor individual computing devices within the network or to monitor the collective behaviour of a group of computing devices as a whole. The multi-layer anomaly detection system 400 includes anomaly detection systems 200 configured to operate at each of a number of different levels within the network. A first layer of anomaly detection systems 200 may be configured to monitor respective individual computing devices. Anomaly detection systems 200 operating within this first layer are provided with the network traffic 430(1) and 430(2) relating to the computing devices that they are respectively monitoring. A second layer of anomaly detection systems 200 may be configured to monitor respective groups of individual computing devices, such as all of the computing devices in a sub-network or all the computing devices that form part of an IoT subsystem operating within the network, or all computing devices of a particular type, such as a particular type of IoT device (in which case the devices in the group may be homogenous). The second layer is provided with information relating to the network traffic for the device group as a whole. Finally, a third layer of anomaly detection system 200 may be configured to monitor the network as a whole. This third layer may be provided with the features of the traffic of the entire network as a whole.

It will be appreciated that the multi-layer anomaly detection system 400, need not necessarily have anomaly detection systems operating at each of the three layers. For example, a multi-layer anomaly detection system 400 could be configured to monitor an IoT sub-system through the inclusion of a respective first layer device monitoring subsystem 200 for each of the IoT devices in that subsystem and a second layer device group monitoring module 200 to monitor the operation of the IoT subsystem as a whole.

It will also be appreciated that although the multi-layer anomaly detection system 400 is shown as receiving separate inputs of network traffic to each of the monitoring subsystems 200, the network traffic for the entire network may simply be provided to the multi-layer anomaly detection system 400 as a single input. The multi-layer anomaly detection system 400 may then process the network traffic data to generate the relevant inputs to each subsystem.

By carrying out monitoring at multiple different layers, the multi-layer anomaly detection system 400 can detect anomalies that might not be detectable if monitoring were only carried out a single layer. This is because, the features are aggregated differently according to the layer at which the monitoring is occurring, allowing different anomalies to be detected.

As set out above, the invention makes use of a cascade (or sequential) of machine learning techniques to not only identify anomalies, but also to learn types of anomalies that are occurring so that the new types of anomaly can be more easily identified, thereby facilitating their analysis and allowing systems employing the invention to adapt to the changing nature of devices and the anomalies that they may experience over time.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for detecting anomalies in a computer network, the method comprising:
   obtaining a model representing normal characteristics of network traffic associated with a set of devices within the computer network;
   analyzing network traffic using the model to identify anomalous network traffic associated with the set of devices;
   obtaining a known anomaly model, which is a different model from the model representing the normal characteristics of network traffic and which represents the characteristics of the network traffic which are associated with known types of anomalies;
   using the known anomaly model to classify the anomalous network traffic and filtering out any of the anomalous network traffic that is classified as being a known type of anomaly and keeping any of the anomalous network traffic that is classified as being an unknown type of anomaly;
   clustering the unknown type of anomalous network traffic into clusters of network traffic that share similar characteristics; and
   providing an indication that either (i) the network traffic associated with at least one of the clusters relates to a new type of anomaly involving the set of devices or (ii) that no new types of anomaly are present.

2. The method of claim 1, wherein the method further comprises updating the model representing the normal characteristics of network traffic in response to receiving an indication that the network traffic associated with the at least one of the clusters relates to a new type of normal behavior for the set of devices such that the updated model represents the characteristics of the network traffic associated with the at least one of the clusters as being normal characteristics for the set of devices.

3. The method of claim 1, wherein
   analyzing the network traffic comprises using the known anomaly model to identify the unknown type of anomalous network traffic that is not associated with the known type of anomaly involving the set of devices.

4. The method of claim 3, wherein the method further comprises updating the known anomaly model in response to receiving an indication confirming that the network traffic associated with the at least one of the clusters is anomalous such that the updated known anomaly model represents the characteristics of the network traffic associated with the at least one of the clusters as being associated with the known type of anomaly involving the set of devices.

5. The method of claim 1, wherein the method further comprises identifying anomalous network traffic that is not associated with a cluster as being benign.

6. The method of claim 1, wherein the characteristics of the network traffic are aggregate characteristics aggregated from the network traffic collectively associated with the set of devices during a time interval of predetermined duration.

7. The method of claim 6, wherein the aggregate characteristics comprise one or more, or all, of:
  a number of packets sent;
  a number of packets received;
  an average sent packet size;
  an average received packet size;
  a variation in sent packet size;
  a variation in received packet size;
  a total amount of data sent;
  a total amount of data received;
  a number of distinct destination IP addresses to which packets are sent;
  a number of distinct source IP addresses from which packets are received;
  a number of distinct destination ports to which packets are sent; and
  a number of distinct source ports from which packets are received.

8. The method of claim 1, wherein all of the devices in the set of devices are the same type of device.

9. The method of claim 8, wherein the devices in the set of devices are all IoT devices and are preferably all associated with the same IoT system.

10. The method of claim 1, wherein the set of devices consists of a single device in the computing network.

11. The method of claim 1, wherein the set of devices comprises a plurality of devices, such that the model represents the normal characteristics of network traffic associated with the plurality of devices as a whole.

12. The method of claim 1, wherein the set of devices comprises all devices in the computer network, such that the model represents the normal characteristics of network traffic associated with the network as a whole.

13. The method of claim 1, further comprising:
  raising an alert indicating the classification of the known type of anomaly when a known type of anomaly is detected.

14. The method of claim 1, further comprising:
  taking an action to mitigate effects of the known type of anomaly.

15. A network monitoring system for detecting anomalies in a computer network, the network monitoring system comprising a processor and a memory storing computer program code which is executable by the processor so that the network monitoring system is at least configured to:

obtain a model representing normal characteristics of network traffic associated with a set of devices within the computer network;
analyze network traffic using the model to identify anomalous network traffic associated with the set of devices;
obtain a known anomaly model, which is a different model from the model representing the normal characteristics of network traffic and which represents the characteristics of network traffic which are associated with known types of anomalies;
use the known anomaly model to classify the anomalous network traffic and filter out any of the anomalous network traffic that is classified as being a known type of anomaly and keep any of the anomalous network traffic that is classified as being an unknown type of anomaly;
cluster the unknown type of anomalous network traffic into clusters of network traffic that share similar characteristics; and
provide an indication that either (i) the network traffic associated with at least one of the clusters relates to a new type of anomaly involving the set of devices or (ii) that no new types of anomaly are present.

16. The network monitoring system according to claim 15, wherein the program code comprises:
  one or more program code modules that are each configured for monitoring a respective device;
  one or more program code modules that are each configured for monitoring a respective group of devices; and
  a program code module that is configured for monitoring the network as a whole.

17. The network monitoring system of claim 15, wherein the network monitoring system is further configured to:
  raise an alert indicating the classification of the known type of anomaly when a known type of anomaly is detected.

18. The network monitoring system of claim 15, wherein the network monitoring system is further configured to:
  take an action to mitigate effects of the known type of anomaly.

19. A non-transitory computer-readable medium storing a computer program which, when executed by one or more processors, is arranged to carry out a method according to claim 1.

* * * * *